A. J. BEATON.
ROLLER.
APPLICATION FILED APR. 10, 1919.

1,326,128.

Patented Dec. 23, 1919.

Inventor
A. J. Beaton
By
Attorney

UNITED STATES PATENT OFFICE.

ALLAN J. BEATON, OF NEW BRITAIN, CONNECTICUT.

ROLLER.

1,326,128.  Specification of Letters Patent.  Patented Dec. 23, 1919.

Application filed April 10, 1919. Serial No. 289,169.

*To all whom it may concern:*

Be it known that I, ALLAN J. BEATON, a citizen of the United States, residing at New Britain, in the county of Hartford and State of Connecticut, have invented certain new and useful Improvements in Rollers, of which the following is a specification.

This invention relates to rollers. A roller involving the invention can be employed with utility in widely-different connections. Experience, however, has proven it to be of especial advantage as a support for a pipe such as is used for illustration in a heating or water-distributing system. In the heating and water-distributing arts, it is not uncommon to support a pipe or pipes at or near a ceiling, and to sustain the pipe or pipes between their ends or more properly between walls, it has been usual to provide grooved rollers in the grooves of which the pipe or pipes are laid. I have several motives in view, among them being the provision of an article of the character set forth which can be inexpensively and readily produced, one which is not unduly heavy yet which possesses great strength and rigidity. In the drawings accompanying and forming part of the present specification I have shown in detail one of the several forms of embodiment of the invention which to enable those skilled in the art to practise the same will be set forth fully in the following description. It will of course be clear that I am not limited to this particular disclosure. I may depart therefrom in several respects within the scope of the invention defined by the claim following said description.

Referring to the accompanying drawings, Figure 1 is an elevation of a roller involving the invention.

Like characters refer to like parts throughout the several views.

As already noted the article constituting the subject matter of the present case is susceptible of general use although it has been found particularly useful as a support for a pipe or pipes such as are found in steam heating and other distributing systems. It has been usual to string several of these rollers on a shaft or spindle which in turn is carried by a pair of pendant arms. Obviously, however, the invention does not concern this particular point but resides merely in the roller.

Figures 1, 2:
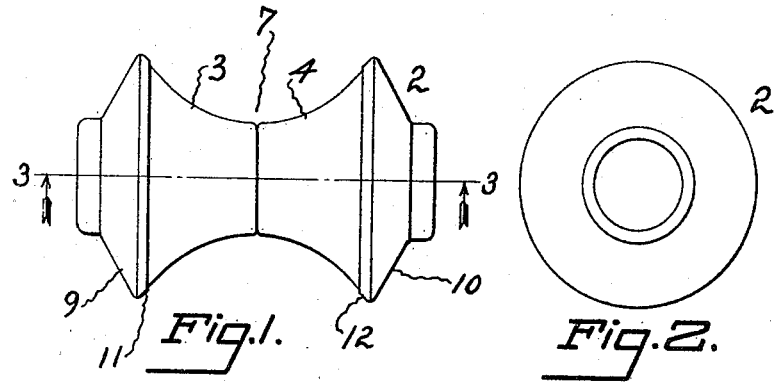
Fig. 2 is a view as seen for example from the right in Fig. 1.
Figure 3:
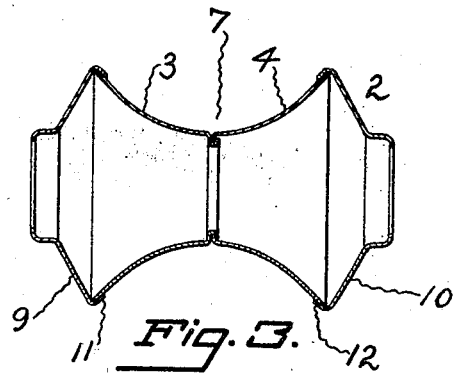
Fig. 3 is a longitudinal section on the line 3—3 of Fig. 1 looking in the direction of the arrows.

A roller such as meets my conditions is denoted in a general way by 2. This roller as shown, includes in its structure two intermediate or body sections as 3 and 4 which are virtually in the form of frusto-conical shells. Each of the sections 3 and 4 has at its inner end, an annular flange designated respectively by 5 and 6. As shown the flange 5 fits flatwise and substantially against the flange 6 as best illustrated in Fig. 3, in view of which circumstance there is presented by the body of the roller a somewhat deep annular groove 7 in which a pipe or something of a similar nature may be disposed. The two sections are as will be clear, of sheet metal and like other parts to which I will hereinafter refer, can be quickly and easily formed by the aid of dies, from proper sheet stock.

Figure 4:
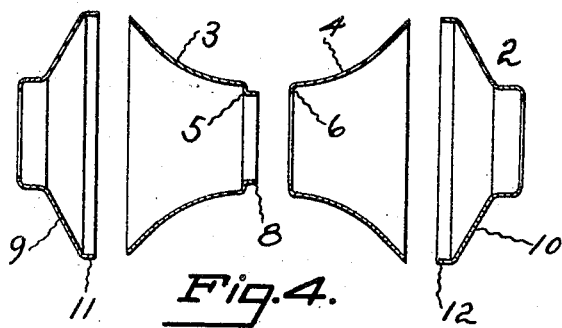
Fig. 4 is a somewhat similar view but with the parts separated.

As shown the section 3 is provided on the annular flange 5, with an annular flange 8 (Fig. 4) which is introduced into the opening presented by the annular flange 6 of the complemental section 4. When this is done the flange 5 it will be clear is seated solidly against the complemental flange 6, this particular relation being shown in Fig. 3. When said seating is obtained the flange 8 is spun down or otherwise laid against the inner face of the flange 6 as shown in Fig. 3 to thus firmly and substantially unite the two parts 3 and 4.

It will be of course evident that the sections 3 and 4 taper outwardly and there are two reason for this, one being that they will jointly present the seat or groove 7 and the other being that provision is thus made for properly uniting the heads or ends with the body portion of the roller. The heads or ends which may be employed are denoted by 9 and 10. As shown said heads have at their inner sides, marginal flanges 11 and 12 which as shown, are completely circular or annular, their diameters in fact being of such size as to receive the outer end portions of the body sections 3 and 4 respectively. In assembling the roller the body sections are first united practically in the manner set forth, after which the outer end portions of the body are fitted within the flanges 11 and 12. Finally these flanges 11 and 12 are spun or otherwise laid down against the outer surface or the outer end portions of the respective sections 3 and 4 as shown best in Fig. 3.

What I claim is:

A roller of the class described comprising a sheet-metal body and sheet-metal ends, the body having practically similar sections each of which has a flange at its inner end, one of the flanges having in turn a flange extending through the opening presented by the other flange and flattened down against the inner surface thereof, the ends being flanged and the flanges of the ends receiving the end portions of the body the flanges of the ends being flattened down against said body.

In testimony whereof I affix my signature in the presence of two witnesses.

ALLAN J. BEATON.

Witnesses:
BERTHA A. MACRISTY,
HEATH SUTHERLAND.